(12) United States Patent
Lin

(10) Patent No.: US 8,115,751 B2
(45) Date of Patent: Feb. 14, 2012

(54) CAPACITIVE TOUCH SENSING ASSEMBLY

(75) Inventor: Teh-Zheng Lin, Taoyuan (TW)

(73) Assignee: Young Fast Optoelectronics Co., Ltd., Kuan Yin, Taoyuan, Taiwan (CN)

( * ) Notice: Subject to any disclaimer, the term of this patent is extended or adjusted under 35 U.S.C. 154(b) by 629 days.

(21) Appl. No.: 12/346,782

(22) Filed: Dec. 30, 2008

(65) Prior Publication Data

US 2010/0164900 A1 Jul. 1, 2010

(51) Int. Cl.
*G06F 3/045* (2006.01)

(52) U.S. Cl. ............ 345/174
(58) Field of Classification Search .......... None
See application file for complete search history.

(56) References Cited

U.S. PATENT DOCUMENTS

| | | | | |
|---|---|---|---|---|
| 5,869,791 A * | 2/1999 | Young | ............ | 178/20.01 |
| 7,030,860 B1 * | 4/2006 | Hsu et al. | ............ | 345/173 |
| 7,202,859 B1 * | 4/2007 | Speck et al. | ............ | 345/174 |
| 2008/0231605 A1 * | 9/2008 | Yang | ............ | 345/173 |
| 2008/0309634 A1 * | 12/2008 | Hotelling et al. | ............ | 345/173 |
| 2009/0315835 A1 * | 12/2009 | De Goes et al. | ............ | 345/173 |
| 2009/0315853 A1 * | 12/2009 | Yang et al. | ............ | 345/174 |
| 2010/0000803 A1 * | 1/2010 | Yang | ............ | 178/18.06 |
| 2010/0164900 A1 * | 7/2010 | Lin | ............ | 345/174 |

* cited by examiner

*Primary Examiner* — Peter Vincent Agustin

(57) ABSTRACT

A capacitive touch sensing assembly is a plate body assembled by a first and second substrate glued by a gluing layer. The first and second substrates are insulated transparent thin plates, and the gluing layer is an insulated transparent adhesive. On an upper surface of the first substrate, a capacitive sensing layer including a plurality of transparent first and second axis traces intersecting to each other. Induction-spots formed on each first axis trace are connected one by one, and induction-spots formed on each second axis trace are formed separately with gaps. An inducting layer has a plurality of conducting wires formed along the direction of the second axis traces. Electrical joints formed on two ends of the conducting wires contact the two adjacent induction-spots of the second axis traces respectively so as to electrically connect all induction-spots on each second axis trace.

15 Claims, 3 Drawing Sheets

CAPACITIVE TOUCH SENSING ASSEMBLY

FIELD OF THE PRESENT INVENTION

The present invention relates to touch sensing assembly, and particular to a capacitive touch sensing assembly with X and Y axis traces formed on the same plane.

DESCRIPTION OF THE PRIOR ART

Touch panels are usually arranged in front of screens of cell phone, camera, and personal digital assistant (PDA) for operating and data input convenience. Because of advantages of stability and long life time, various types of touch panel are widely applied in products of communication, computer, and consumer. A prior capacitive touch panel includes an X axis sensing layer and a Y axis sensing layer and both of it are arranged inside the touch panel and insulated from each other. The X and Y sensing layers are grounded and connected to a control circuit respectively. When operating, an instant capacity effect is generated by a conductor or a user's finger touch so as the position being touched will be located by detection of the variation of capacitance. The capacitive touch panel is capable of being operated by human finger, therefore it is convenient for an input operation. The panel will not repeatedly sustain stress and then deformed and damaged because an input is performed without strongly pressing on the panel. Thus, such touch panel is stable and with long life time. However, the prior capacitive touch panel is glued by two plates with the X and Y axis sensing traces formed separately. When assembling the X and Y sensing traces of the two different layers, a misalignment is happened and the sensitivity and precision of the sensing signal of the capacity will be damaged. However, the traces and the un-patterned area on different layers are differently pervious to light, the light passing through the panel will be refracted and causes a deformation and distortion of image displayed from the screen under the touch panel.

SUMMARY OF THE PRESENT INVENTION

Accordingly, the primary object of the present invention is to provide a touch sensing assembly with the X and Y axis traces in the same plane so as the traces can be formed more precisely for the sensitivity and the precision of a sensing effect. Also, the process is simplified and the cost is lowered by reducing layers of the thinned plate body.

A secondary object of the present invention is to provide a touch sensing assembly with the X and Y axis traces in the same plane so that the un-patterned area ratio is substantially reduced. The assembly will be uniformly pervious to light and the image distortion of the screen under the touch panel will be corrected.

To achieve above object, the present invention provides a capacitive touch sensing assembly comprising: a first substrate made of highly transparent insulated thin plate, and on a surface thereof further comprising at least: a capacitive sensing layer of a transparent thin film with good conductivity having a plurality of first and second axis traces intersecting to each other; induction-spots formed on each first axis trace being connected one by one, and induction-spots formed on each second axis trace being formed insulated; an end of each first and second axis trace being respectively conducted to metal conducting wires formed on edges of the substrate and then being conducted to a signal output terminal; an inducting layer having a plurality of conducting wires formed along the direction of the second axis traces; electrical joints formed on two ends of the conducting wires contacting the two adjacent induction-spots of the second axis traces respectively so as to electrically connect all induction-spots on each second axis trace; an isolating layer having a plurality of insulated films covered between the conducting wires of the inducting layer and the capacitive sensing layer; the conducting wire except the electrical joints thereof being covered by the insulated films from contacting the capacitive sensing layer; a second substrate made of highly transparent insulated thin plate having an opaque frame formed on an edge of a bottom surface of the second substrate; and a gluing layer being an insulated transparent UV adhesive arranged between the first and the second substrates so as to glue the first and the second substrates as a plate body.

The first and the second substrates are thin plates made of one of material of glass, Polycarbonate (PC), Polythylene terephthalate (PET), polymethylmethacrylate (PMMA), and Cyclic Olefin Copolymer (COC). The capacitive sensing layer is a transparent conductive film made of one material of Indium Tin Oxide (ITO) and Poly ethylenedioxythiophene (PEDOT). The first and the second axis traces are approximately perpendicular to each other. The inducting layer is a transparent conductive film made of one material of Indium Tin Oxide (ITO) and Poly ethylenedioxythiophene (PEDOT). Conducting wires of the inducting layer are made of opaque metal with a diameter less than 20 μm. The electrical joints with wider contact area than the conducting wire itself are formed on two ends of each conducting wire. The insulated thin films of the isolating layer are highly transparent insulated thin films with a permittivity about 2 to 4 and with a thickness less than 2 μm. The highly transparent insulated thin films are made of one material of ink and Polythylene terephthalate (PET). Edges of the insulated films of the isolating layer are gradually thinner outwards as a slope. An angle of a cross section of the slope on the insulated film is less than 45 degrees. The opaque frame formed on the second substrate is made of one of ink and metal-sputtered film. The gluing layer is made of one of a light curing adhesive or heat curing adhesive. The transparent conductive layer is one of an Indium Tin Oxide (ITO) film and a Poly ethylenedioxythiophene (PEDOT) film.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
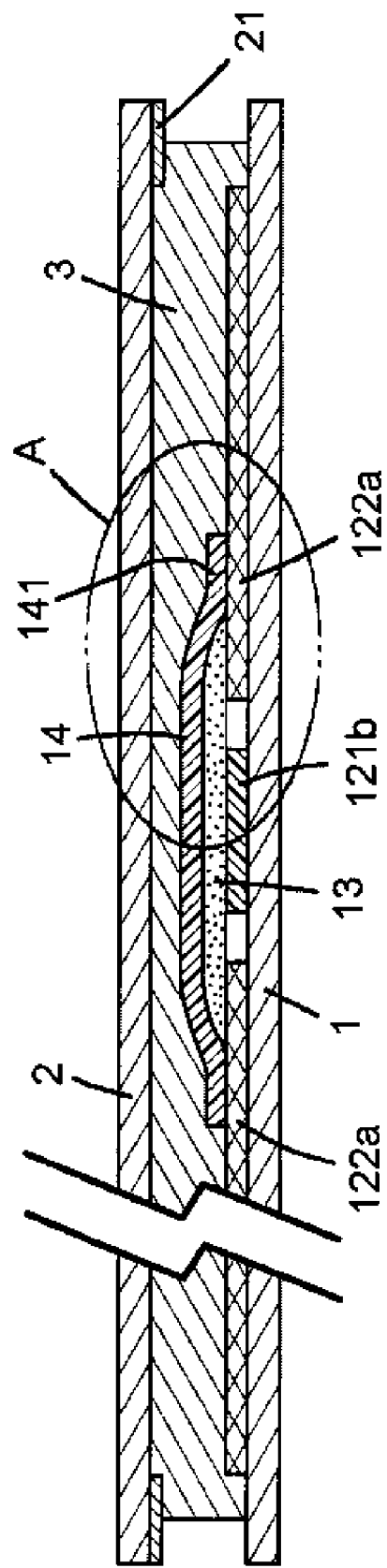
FIG. 1 is a cross section view showing an assembly of an embodiment of the present invention.
Figure 2:
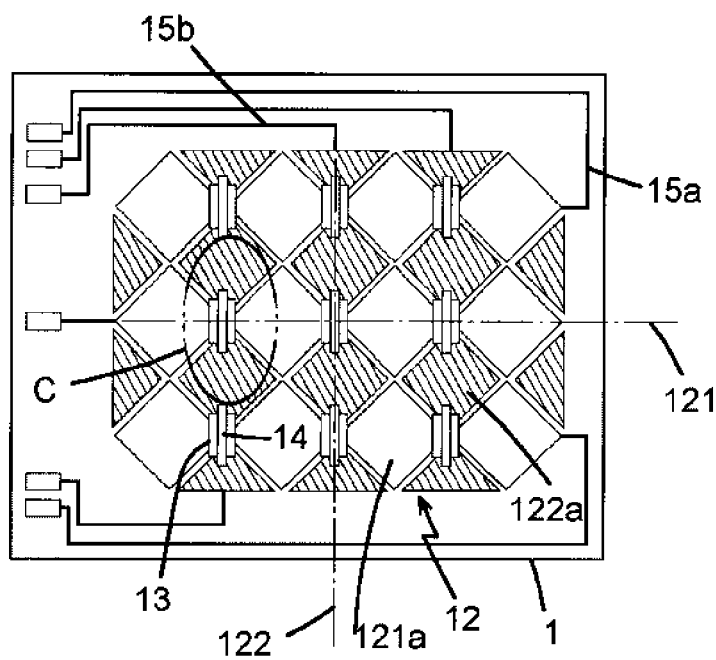
FIG. 2 is a top view of a bottom substrate of the embodiment of the present invention.
Figure 3:
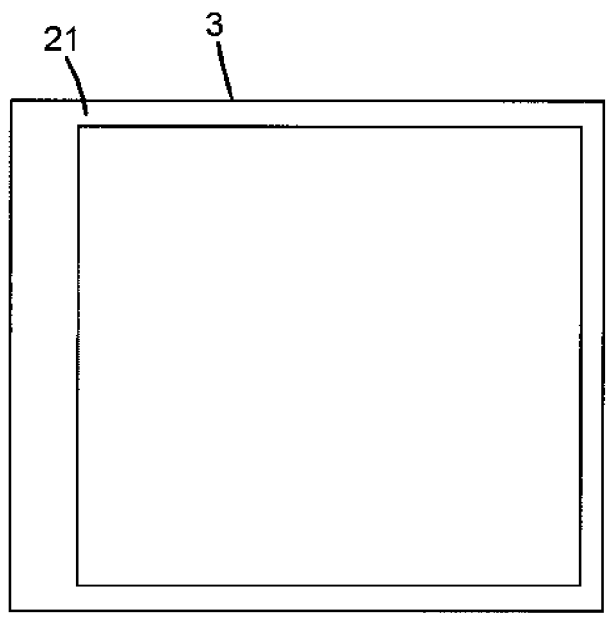
FIG. 3 is a top view of an upper panel of the embodiment of the present invention.
Figure 4:
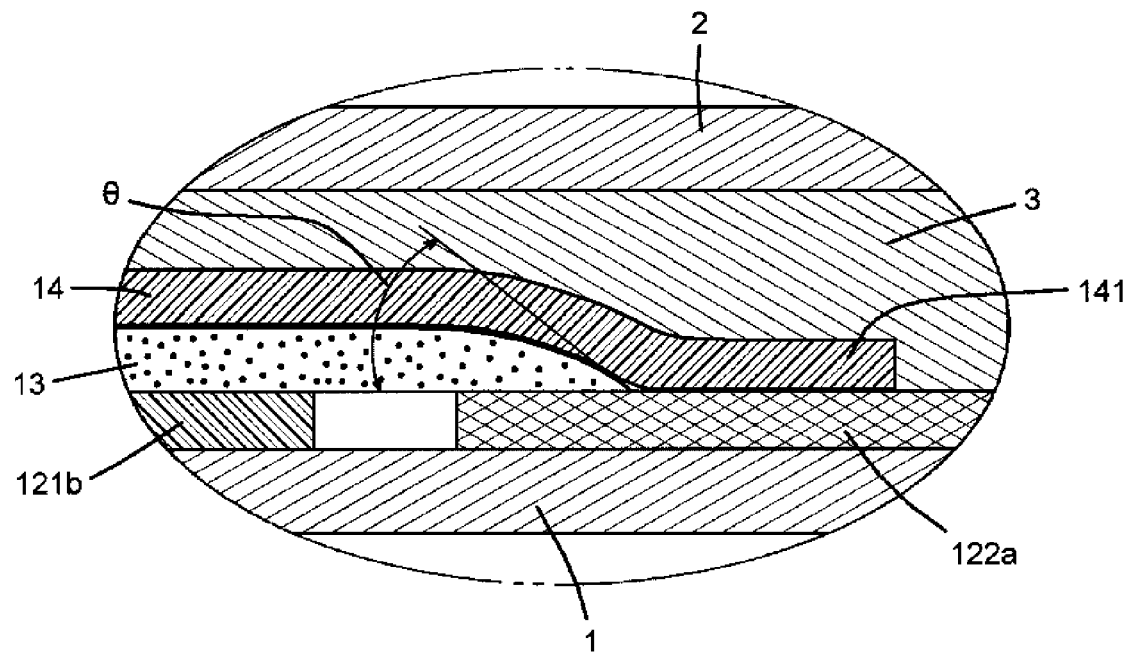
FIG. 4 is an enlarged view showing a portion A of the FIG. 1.
Figure 5:
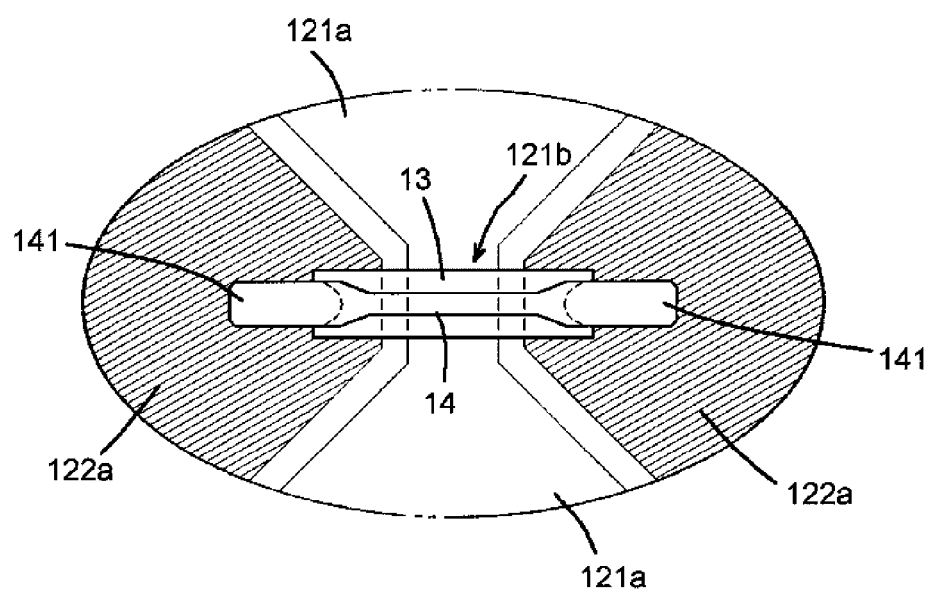
FIG. 5 is an enlarged view showing a portion C of the FIG. 2.

With reference to Figs. provided in the following, a capacitive touch sensing assembly according to the present invention is a plate body assembled by a bottom substrate 1 and an upper panel 2 glued by a gluing layer 3. The bottom substrate 1 and the upper panel 2 are insulated thin glasses with highly transparent property, and the gluing layer 3 is an insulated transparent UV adhesive. A colored metal-sputtered frame 21 is formed on an edge of a bottom surface of the upper panel 2. On an upper surface of the bottom substrate 1, a capacitive sensing layer 12, an isolating layer 13, and an inducting layer 14 are formed. The capacitive sensing layer 12 is made of a transparent conductive film of Indium Tin Oxide (ITO). The capacitive sensing layer 12 includes a plurality of transparent X axis traces 121 which are arranged in parallel with a fixed interval between, and also includes a plurality of transparent Y axis traces 122 which are arranged in parallel with a fixed interval between. The X and Y traces 121, 122 intersect with each other as a matrix. Induction-spots 121a are formed on each X axis trace 121 and are connected one by one, and induction-spots 122a are formed on each Y axis trace but are formed separately with gaps. An end of each X and Y axis trace is respectively conducted to metal conducting wires 15a and 15b formed on edges of the substrate and then conduct to a signal output terminal (not shown). Through above connections, sensing signals generated by the X axis traces 121 and Y axis traces 122 on the capacitive sensing layer 12 can be transmitted to a succeeding signal processing circuit (not shown). The isolating layer 13 consists of a plurality of small-area insulated thin films made of highly transparent Polythylene terephthalate (PET) with a permittivity about 3 and with a thickness about 1.5 μm, and each insulated film of the isolating layer 13 will cover at least a portion of the X axis trace 121 which lies between two adjacent induction-spots 122a of the Y axis trace 122. Edges of each insulated film of the isolating layer 13 covered above two adjacent induction-spots 122a of the Y axis trace 122 are gradually thinner outwards as a slope, and an angle of the above slope in a cross section is about 45 degrees (referring to FIGS. 1 and 4). The inducting layer 14 consists of a plurality of conducting wires formed along the direction of the Y axis traces. Each conducting wire is made of an opaque metal conductor with a diameter less than 15 μm. On two ends of each conducting wire of the inducting layer 14, electrical joints 141 with wider contact area than the conducting wire itself are formed. Each conducting wire of the inducting layer 14 is formed on an upper surface of each insulated film of the isolating layer 13, and the electrical joints 141 of the conducting wire are arranged outside the insulated film so as to connect the two adjacent induction-spots 122a below the insulated film (referring to FIGS. 2 and 5). In the assembly of the capacitive sensing layer 12, isolating layer 13, and the inducting layer 14, the insulated films of the isolating layer 13 will cover sections of the X axis traces 121 lay between two adjacent induction-spots 122a of the Y axis traces 122, and the electrical joints 141 on the conducting wires of the inducting layer 14 will contact the two adjacent induction-spots 122a of the Y axis traces 121 respectively to electrically connect all induction-spots on each Y axis trace so that the capacitive touch sensing assembly according to the present invention is formed.

In the above mentioned assembly, an equivalent capacity is formed between the X axis trace 121 and the metal conducting wire 15a, and also between the Y axis trace 22 and the metal conducting wires 15b. When a finger or a conductor touches or slides on a certain position on a surface of the assembly, the signal processing circuit will locate the position by the variation of the capacitance. Therefore, the transparent assembly of the present invention can be arranged in front of the screen of an electronic product so that a user can easily perform an input by finger touch under the instruction displayed on the screen.

Moreover, the X axis traces and the Y axis traces of the capacitive touch panel of the present invention are arranged precisely because both of them are formed on the same plane. Also, the capacitive sensing signals are sensitive and precise. The manufacturing process is simplified and the cost is lowered under the simply layers of the assembly according to the present invention, and also the assembly is uniformly pervious to light and an image distortion of the screen under the assembly will be corrected.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A capacitive touch sensing assembly comprising:
   a first substrate made of highly transparent insulated thin plate, and on
      a surface thereof further comprising at least:
         a capacitive sensing layer of a transparent thin film with good conductivity having a plurality of first and second axis traces intersecting to each other; induction-spots formed on each first axis trace being connected one by one, and induction-spots formed on each second axis trace being formed insulated; an end of each first and second axis trace being respectively conducted to metal conducting wires formed on edges of the substrate and then being conducted to a signal output terminal;
         an inducting layer having a plurality of conducting wires formed along the direction of the second axis traces; electrical joints formed on two ends of the conducting wires contacting the two adjacent induction-spots of the second axis traces respectively so as to electrically connect all induction-spots on each second axis trace;
         an isolating layer having a plurality of insulated films covered between the conducting wires of the inducting layer and the capacitive sensing layer; the conducting wire except the electrical joints thereof being covered by the insulated films from contacting the capacitive sensing layer;
   a second substrate made of highly transparent insulated thin plate having an opaque frame formed on an edge of a bottom surface of the second substrate; and
   a gluing layer being an insulated transparent UV adhesive arranged between the first and the second substrates so as to glue the first and the second substrates as a plate body.

2. The capacitive touch sensing assembly as claimed in claim 1, wherein the first and the second substrates are thin plates made of one of material of glass, Polycarbonate (PC), Polythylene terephthalate (PET), polymethylmethacrylate (PMMA), and Cyclic Olefin Copolymer (COC).

3. The capacitive touch sensing assembly as claimed in claim 1, wherein the capacitive sensing layer is a transparent conductive film made of one material of Indium Tin Oxide (ITO) and Poly ethylenedioxythiophene (PEDOT).

4. The capacitive touch sensing assembly as claimed in claim 1, wherein the first and the second axis traces are approximately perpendicular to each other.

5. The capacitive touch sensing assembly as claimed in claim 1, wherein the inducting layer is a transparent conductive film made of one material of Indium Tin Oxide (ITO) and Poly ethylenedioxythiophene (PEDOT).

6. The capacitive touch sensing assembly as claimed in claim 1, wherein conducting wires of the inducting layer are made of opaque metal with a diameter less than 20 μm.

7. The capacitive touch sensing assembly as claimed in claim 1, wherein the electrical joints with wider contact area than the conducting wire itself are formed on two ends of each conducting wire.

8. The capacitive touch sensing assembly as claimed in claim 1, wherein the insulated thin films of the isolating layer are highly transparent insulated thin films with a permittivity about 2 to 4 and with a thickness less than 2 μm.

9. The capacitive touch sensing assembly as claimed in claim 8, wherein the highly transparent insulated thin films are made of one material of ink and Polythylene terephthalate (PET).

10. The capacitive touch sensing assembly as claimed in claim 1, wherein edges of the insulated films of the isolating layer are gradually thinner outwards as a slope.

11. The capacitive touch sensing assembly as claimed in claim 10, wherein an angle of a cross section of the slope on the insulated film is less than 45 degrees.

12. The capacitive touch sensing assembly as claimed in claim 1, wherein the opaque frame formed on the second substrate is made of one of ink and metal-sputtered film.

13. The capacitive touch sensing assembly as claimed in claim 1, wherein the gluing layer is made of one of a light curing adhesive or heat curing adhesive.

14. The capacitive touch sensing assembly as claimed in claim 1, wherein a transparent conductive layer is formed on one surface of the plate body assembled by the first and the second substrates.

15. The capacitive touch sensing assembly as claimed in claim 14, wherein the transparent conductive layer is one of an Indium Tin Oxide (ITO) film and a Poly ethylenedioxythiophene (PEDOT) film.

* * * * *